(12) United States Patent
Miller

(10) Patent No.: US 10,958,778 B1
(45) Date of Patent: Mar. 23, 2021

(54) CONTACT SYSTEM FOR A COMPUTING PLATFORM

(71) Applicant: Peggy S. Miller, New Salisbury, IN (US)

(72) Inventor: Peggy S. Miller, New Salisbury, IN (US)

( * ) Notice: Subject to any disclaimer, the term of this patent is extended or adjusted under 35 U.S.C. 154(b) by 0 days.

(21) Appl. No.: 14/857,350

(22) Filed: Sep. 17, 2015

Related U.S. Application Data

(60) Provisional application No. 62/051,509, filed on Sep. 17, 2014.

(51) Int. Cl.
| | | |
|---|---|---|
| *H04M 11/04* | (2006.01) | |
| *H04M 1/725* | (2021.01) | |
| *G06F 3/0481* | (2013.01) | |
| *G06F 3/0482* | (2013.01) | |
| *G06F 3/0484* | (2013.01) | |

(52) U.S. Cl.
CPC ...... *H04M 1/72583* (2013.01); *G06F 3/0482* (2013.01); *G06F 3/04817* (2013.01); *G06F 3/04842* (2013.01); *G06F 3/04847* (2013.01); *H04M 1/72541* (2013.01); *H04M 1/72552* (2013.01); *H04M 1/72563* (2013.01); *H04M 1/72588* (2013.01)

(58) Field of Classification Search
CPC ......... H04M 1/72583; H04M 1/72541; H04M 1/72552; H04M 1/72563; H04M 1/72588; G06F 3/04847; G06F 3/0482; G06F 3/04842
USPC ....... 455/404.1, 550.1, 566, 556.2, 567, 557
See application file for complete search history.

(56) References Cited

U.S. PATENT DOCUMENTS

| | | | | |
|---|---|---|---|---|
| 7,113,090 B1 * | 9/2006 | Saylor | ............... | G08B 13/19682 340/5.33 |
| 7,353,016 B2 * | 4/2008 | Roundtree | .......... | G06F 9/45512 455/414.1 |
| 7,590,696 B1 * | 9/2009 | Odell | .................... | G06Q 10/107 455/466 |
| 7,945,543 B2 * | 5/2011 | Kennedy | ........... | G06F 17/30306 707/696 |
| 7,945,546 B2 * | 5/2011 | Bliss | .................... | G01C 21/367 707/705 |
| 8,271,591 B2 * | 9/2012 | Malik | .................. | G06Q 10/107 709/203 |
| 8,682,298 B2 * | 3/2014 | Roundtree | ................. | 455/414.1 |
| 8,855,289 B2 * | 10/2014 | Kaplan | ............. | H04M 3/42195 379/210.01 |
| 8,938,060 B2 * | 1/2015 | Timmins | ............. | H04M 3/4931 379/218.02 |
| 8,963,962 B2 * | 2/2015 | Ubillos | ................... | H04L 51/24 345/661 |
| 9,031,615 B2 * | 5/2015 | Hardy | ............... | H04M 1/27455 455/418 |
| 9,071,950 B2 * | 6/2015 | Mairs | ...................... | H04L 67/14 |
| 9,241,063 B2 * | 1/2016 | Shih | ........................ | H04M 1/56 |
| 9,250,780 B2 * | 2/2016 | Wang | ................. | G06F 3/04845 |
| 9,319,356 B2 * | 4/2016 | Odell | ..................... | H04L 51/04 |
| 9,350,845 B2 * | 5/2016 | Vendrow | ................ | H04M 1/57 |

(Continued)

*Primary Examiner* — Marceau Milord
(74) *Attorney, Agent, or Firm* — Middleton Reutlinger

(57) ABSTRACT

The present invention comprises system and method for configuring and displaying contact information in an easy-to-use fashion on a computing platform. The system includes the ability to select a contact for a phone call or text message with minimal user interaction.

11 Claims, 12 Drawing Sheets

(56) References Cited

U.S. PATENT DOCUMENTS

| | | | | |
|---|---|---|---|---|
| 9,460,057 B2* | 10/2016 | Grossman | ............ | G06F 17/212 |
| 9,479,716 B2* | 10/2016 | Liao | .................. | H04N 5/23293 |
| 9,626,365 B2* | 4/2017 | Grossman | ............ | G06K 9/6218 |
| 9,632,613 B2* | 4/2017 | Matsushima | ......... | G06F 3/0416 |
| 9,666,193 B2* | 5/2017 | Feng | ................. | H04N 21/4788 |
| 9,841,874 B2* | 12/2017 | Gu | ..................... | G06F 3/04883 |
| 9,867,023 B2* | 1/2018 | Rauner | .............. | H04L 12/1895 |
| 9,886,173 B2* | 2/2018 | Grossman | ............ | G06F 3/0484 |
| 10,051,103 B1* | 8/2018 | Gordon | ................... | G06F 9/451 |
| 10,185,476 B2* | 1/2019 | Grossman | ............ | G06F 3/0484 |
| 10,365,797 B2* | 7/2019 | Grossman | ............ | G06F 16/285 |
| 10,419,379 B2* | 9/2019 | Celikyilmaz | ............ | G06F 8/34 |
| 10,440,169 B1* | 10/2019 | Gordon | .............. | G06F 3/04886 |
| 10,536,577 B2* | 1/2020 | Mittal | .................. | H04M 3/493 |
| 10,776,103 B2* | 9/2020 | Gordon | ................ | G06F 1/1673 |
| 2012/0190386 A1* | 7/2012 | Anderson | .............. | G01S 19/14 |
| | | | | 455/456.3 |
| 2014/0203909 A1* | 7/2014 | Elgebaly | ................ | H04W 4/21 |
| | | | | 340/8.1 |
| 2018/0032997 A1* | 2/2018 | Gordon | ................ | F01D 25/005 |

* cited by examiner

Example Interface

Home Page
- Allows a user to dial a contact or emergency number by touching a picture.
- Allows user to access the settings page.
- Allows user to close the application.

Personal Call
- Displays image associated with contact.
- Displays number dialed.
- Displays call duration.
- Allows user to cancel call and return to Personal Contact screen.

Settings
- Displays all contacts with image and phone number associate with contact.
- Allows user add new contact.
- Allows user to edit content of existing contact.
- Allows user to delete existing contact.
- Allows user to change display position of contact on home screen.
- Allows user to close settings and return to home screen.

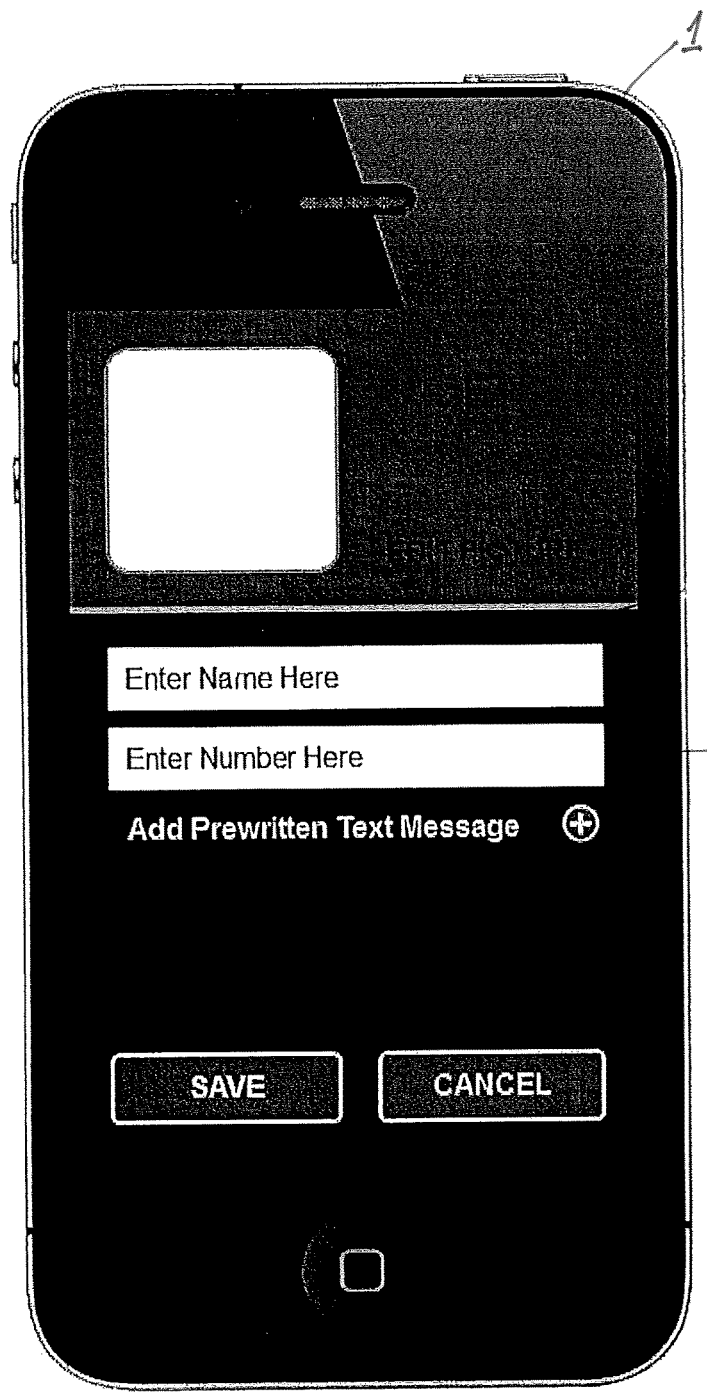

New Contact
- Requires user to enter a picture or icon for contact. Will access user's phone gallery, phone camera, and included icon (clip-art) set.
- Requires user to enter a name for contact.
- Requires user to enter a phone number for contact.
- Allows user to add pre-written text messages associated with contact.
- Allows a user to save contact.
- Allows a user to cancel addition of new contact and return to settings screen.

FIG. 11

Edit Contact
- Displays number and image associated with contact.
- Allows user to edit image for contact. Will access user's phone gallery, phone camera, and included icon (clip-art) set.
- Allows user to enter new name for contact.
- Allows user to enter new phone number for account.
- Allows user to add/edit pre-existing text messages for account.
- Allows a user to save contact.
- Allows a user to cancel addition of new contact and return to settings screen.

FIG. 12

CONTACT SYSTEM FOR A COMPUTING PLATFORM

BACKGROUND OF THE INVENTION

Field of the Invention

The present invention relates generally to a contact organizing and selection system and more specifically to a system for a mobile phone or other computing platform that enables a user to quickly and easily select a variety of predetermined contacts to call and message.

Description of the Related Art

Many types of user contact applications exist for computing platforms such as mobile devices. Nearly every mobile phone and personal computer utilizes a contact organization system that enables a user to select a contact, such as a person or business, and associate a phone number with that contact. The contact may then be called, or text-messaged as required by manually selecting a desired option, such as a phone number, e-mail, or text messaging option.

However, some users, such as the very young, very old, people with certain disabilities, brain injuries, stroke or trauma victims, and people with vision impairment, have a great deal of difficulty selecting and/or editing contact information on standard cellular phone platforms. In many contact systems, the icons or options to be selected are relatively small and difficult to see and select. In these situations, where a person may need to quickly access assistance, they may be unable to read or select an appropriate contact. This problem is particularly acute where the user is under duress and may need to contact an emergency service, such as police, fire, or emergency medical assistance.

Accordingly, there is a need in the art for a simple and reliable contact system for a computing platform that is easy to configure, readily accessible, and visually simple to operate.

BRIEF DESCRIPTION OF THE DRAWING FIGURES

FIG. 11 is view of a new contact screen in accordance with one embodiment of the present invention.

FIG. 12 is view of an edit contact screen in accordance with one embodiment of the present invention.

DETAILED DESCRIPTION OF THE PREFERRED EMBODIMENT(S)

Referring now to drawing FIGS. 1-12, and in accordance with one embodiment of the present invention, a system 10 and method for configuring and selecting a contact to communicate with on a computing platform is depicted. In the context of this application, a contact may be a person, business, emergency service, or any other entity that can accept a phone call, text, e-mail or other communication. While the present invention is intended to be operated in the environment of a software application or similar instruction set suitable for use in, for example, Apple IOS 5, 6, and 7 devices as well as Google devices and all other devices capable of digital or analog signal communication, the system and method of the present invention is not limited to these devices, operating systems, or computing platforms. Furthermore, this specification will describe the invention in the context of a mobile computing platform, for example a cellular phone having a touch screen or equivalent graphical user interface. This exemplary embodiment of the invention is not intended to be limiting thereof, and one of ordinary skill in the art will understand that the system 10 and method of the invention described herein may be used in a wide variety of computing platforms without departing from the scope in the present invention.

Additionally, the contact date and the information associated therewith discussed in this specification may be stored in data memory in a device for rapid access or alternatively on a remote server that is accessed by the device without departing from the scope of the present invention. In either of the above embodiments of the invention a database comprised of organized data memory is used to store and access user data, wherein an individual device may have a device identification associated therewith as well as other data records, including but not limited to e-mail account information, passwords, and contact information such as an index, user identification, timestamps, an image file, an image identifier, an ordering identifier which determines the order of contact display, as well as various other contact attributes used to identify and describe each contact in system 10.

Figure 1:
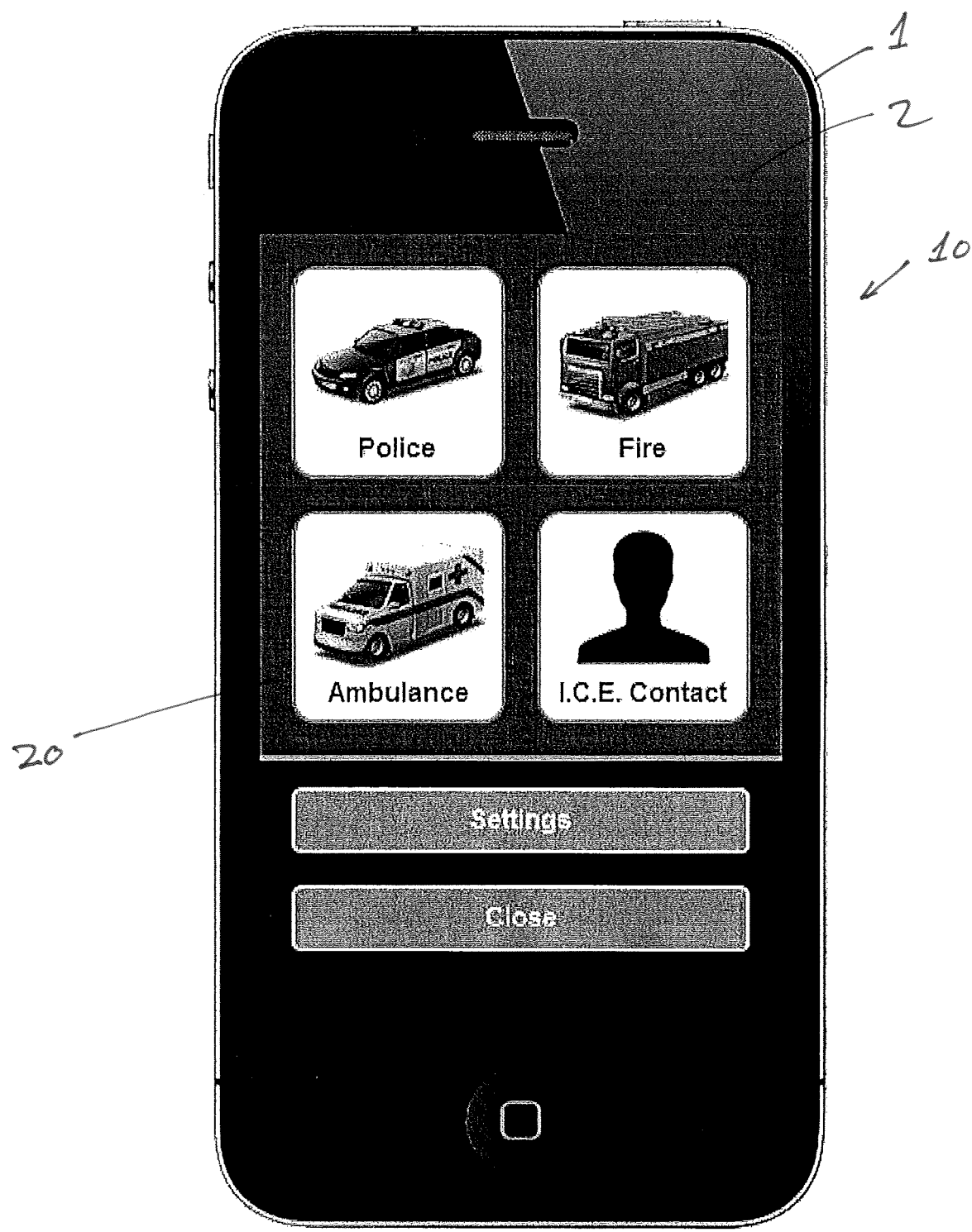
FIG. 1 is a view of a contact display screen in accordance with one embodiment of the present invention.
Figure 2:
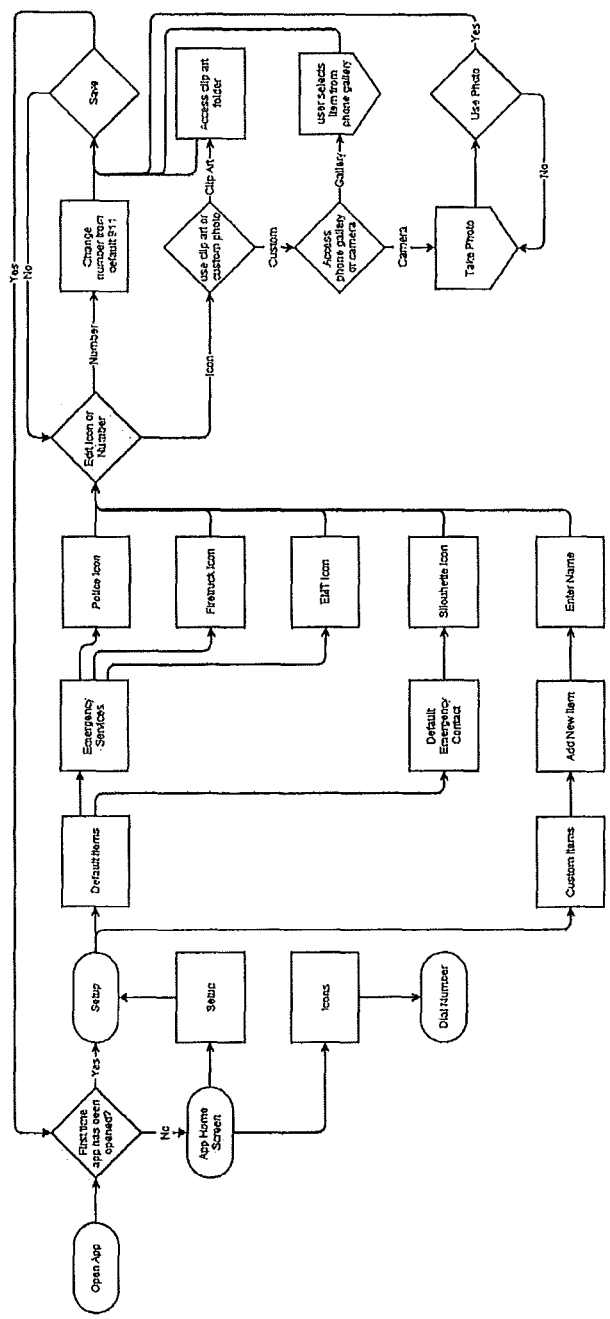
FIG. 2 is a functionality flow chart in accordance with one embodiment of the present invention.
Figure 3:
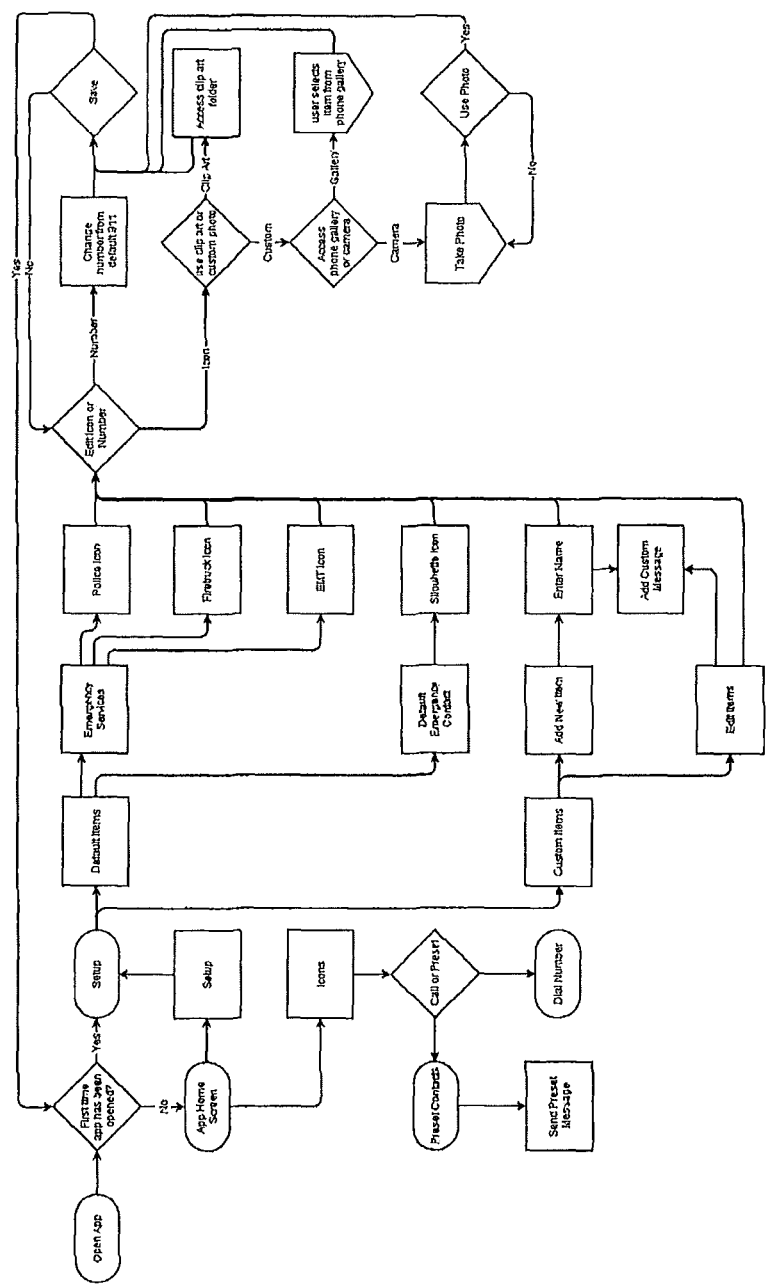
FIG. 3 is a functionality flow chart in accordance with one embodiment of the present invention.

The present invention permits a user to configure a contact display screen 20, a non-limiting example of which is shown in FIG. 1, that facilitates communication with the contacts defined by system 10 in a simple one or two step process. System 10 mat include a software instruction set that is accessed and executed by a processor of a device 1 such as a smart phone having a touchscreen operator interface 2. When system 10 is operated for the first time, a user selects a contact application icon displayed on the touch screen 2 of device 1 to initiate system 10, thereby opening a setup display 22. The setup display permits configuration of a plurality of default contacts and a plurality of custom contacts by entering data such as names, phone numbers, e-mail addresses, and other contact information via touch screen 2. As depicted in FIGS. 2 and 3 default contacts that are provided by system 10 may include emergency services contacts such as police, fire, ambulance, and an emergency contact. Each of these contacts may have associated with it an icon that depicts the service or person being contacted. Alternatively, a customized icon may be chosen from a user's photo gallery or a clip art folder rather than use the provided icon. As an example, a police car icon could be used for police, a fire truck for fire emergencies, and an ambulance for EMT. These icons may be sized relatively large to occupy a significant portion of touch screen 1, as depicted in FIGS. 1 and 4, to enable quick selection by a user.

Figure 10:
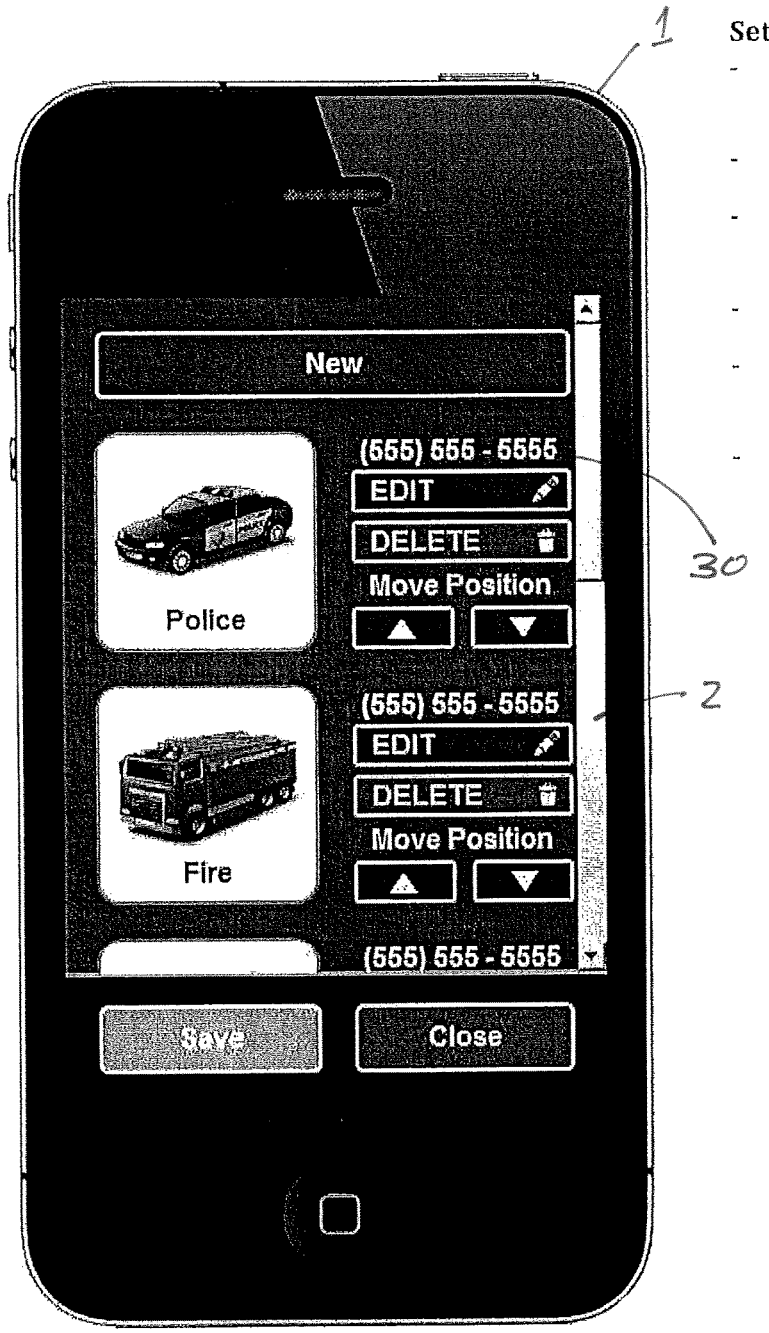
FIG. 10 is view of a configuration screen in accordance with one embodiment of the present invention.

Again referring to FIGS. 2, 3 and to FIGS. 10-12, a user may edit or change the number for an emergency service from 911 to another number if required. An editor interface 30 is provided that provides a user the ability to modify and customize contacts and add new contacts as desired. Furthermore, a user may define a plurality of custom contacts to be stored and displayed on the home page display depicted in FIG. 4 that enables the user to select a contact that they need to communicate with often, enter via touchscreen 2 an associated phone number and select an icon or photograph to identify the contact. The custom contacts may also be sized large to enable easy selection. This feature of the invention makes it very easy to use for those who may have difficulty operating standard phone contact systems.

Figure 4:
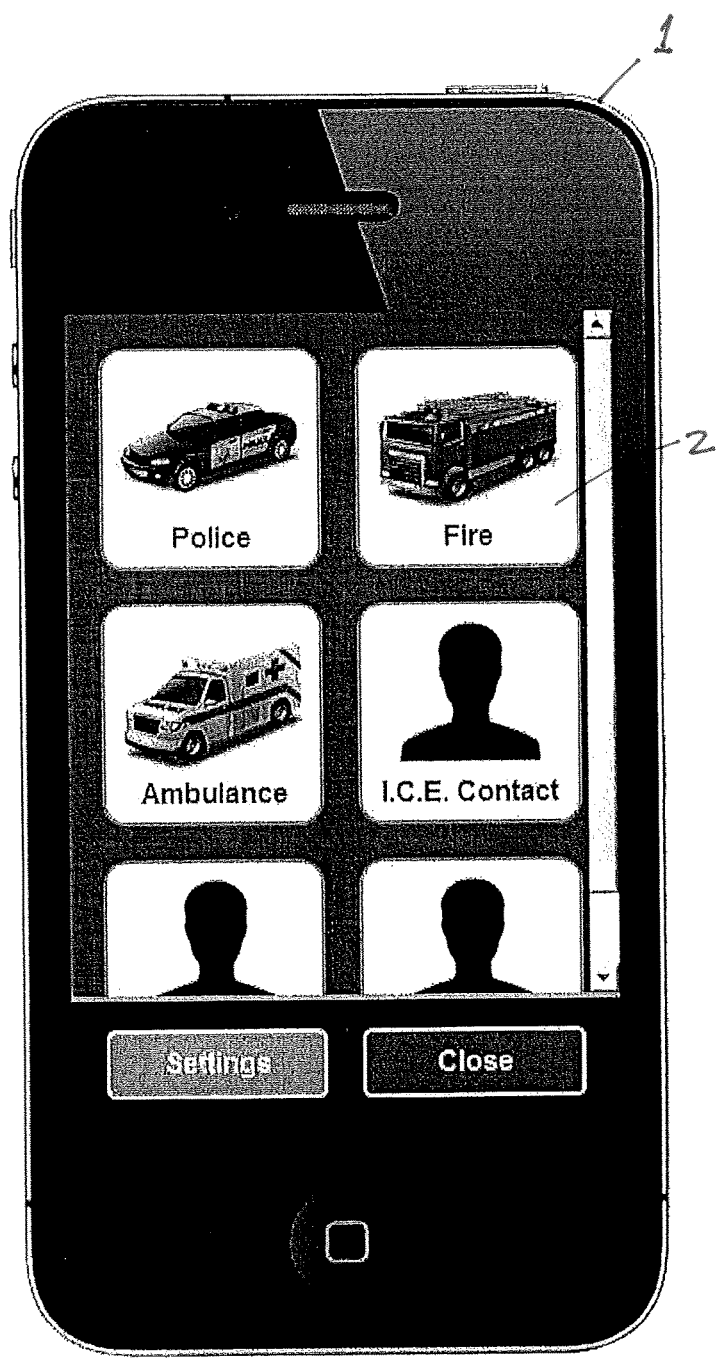
FIG. 4 is view of a home screen in accordance with one embodiment of the present invention.

Once the emergency and custom contacts are configured to the user's satisfaction, the user selects a save button as shown in FIG. 10, for example, and the system 10 home screen display appears as shown in FIG. 4. The home screen may be scrolled up and down to display all contacts configured in system 10.

Figure 5:
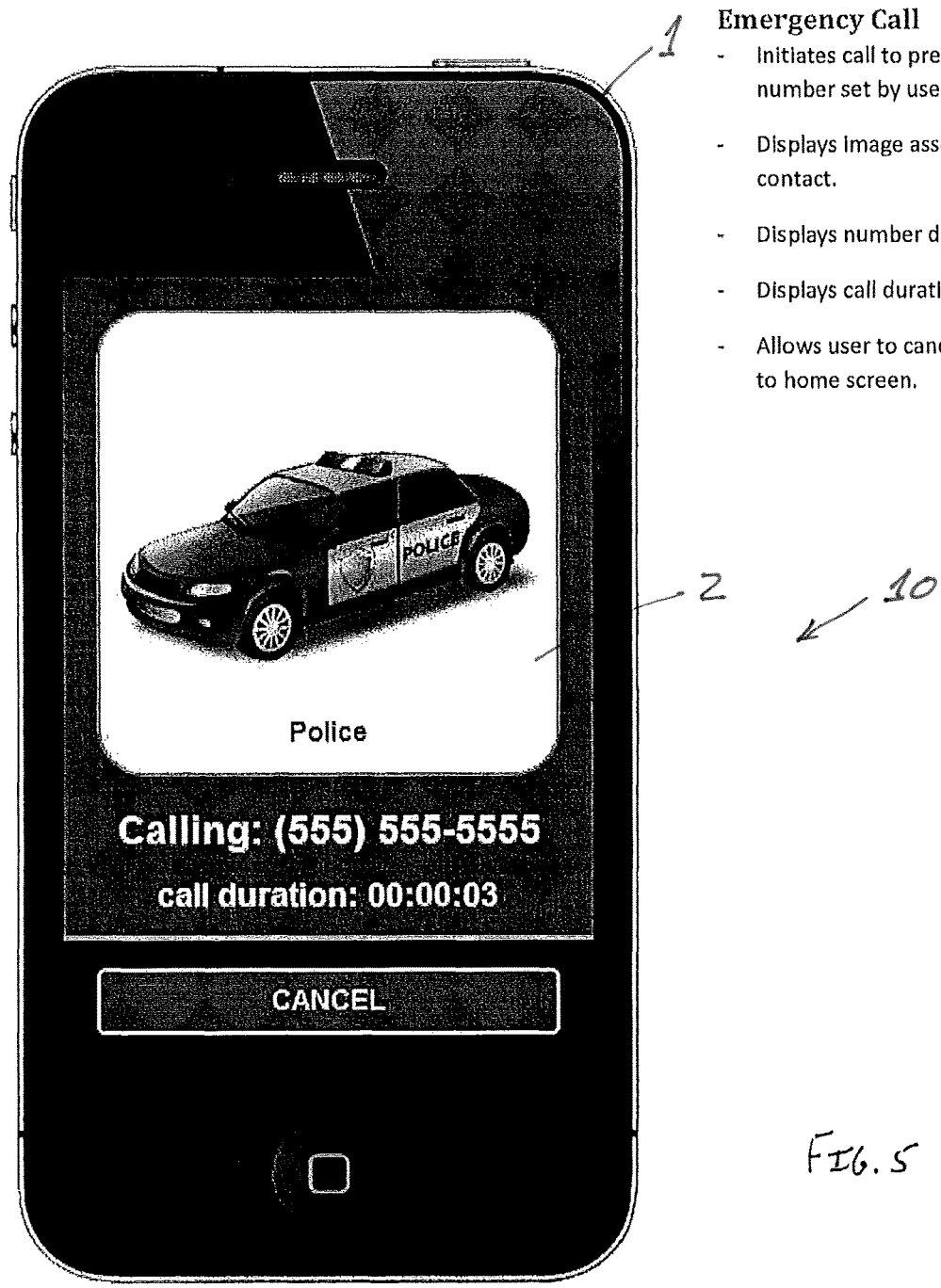
FIG. 5 is view of a call screen in accordance with one embodiment of the present invention.
Figure 6:
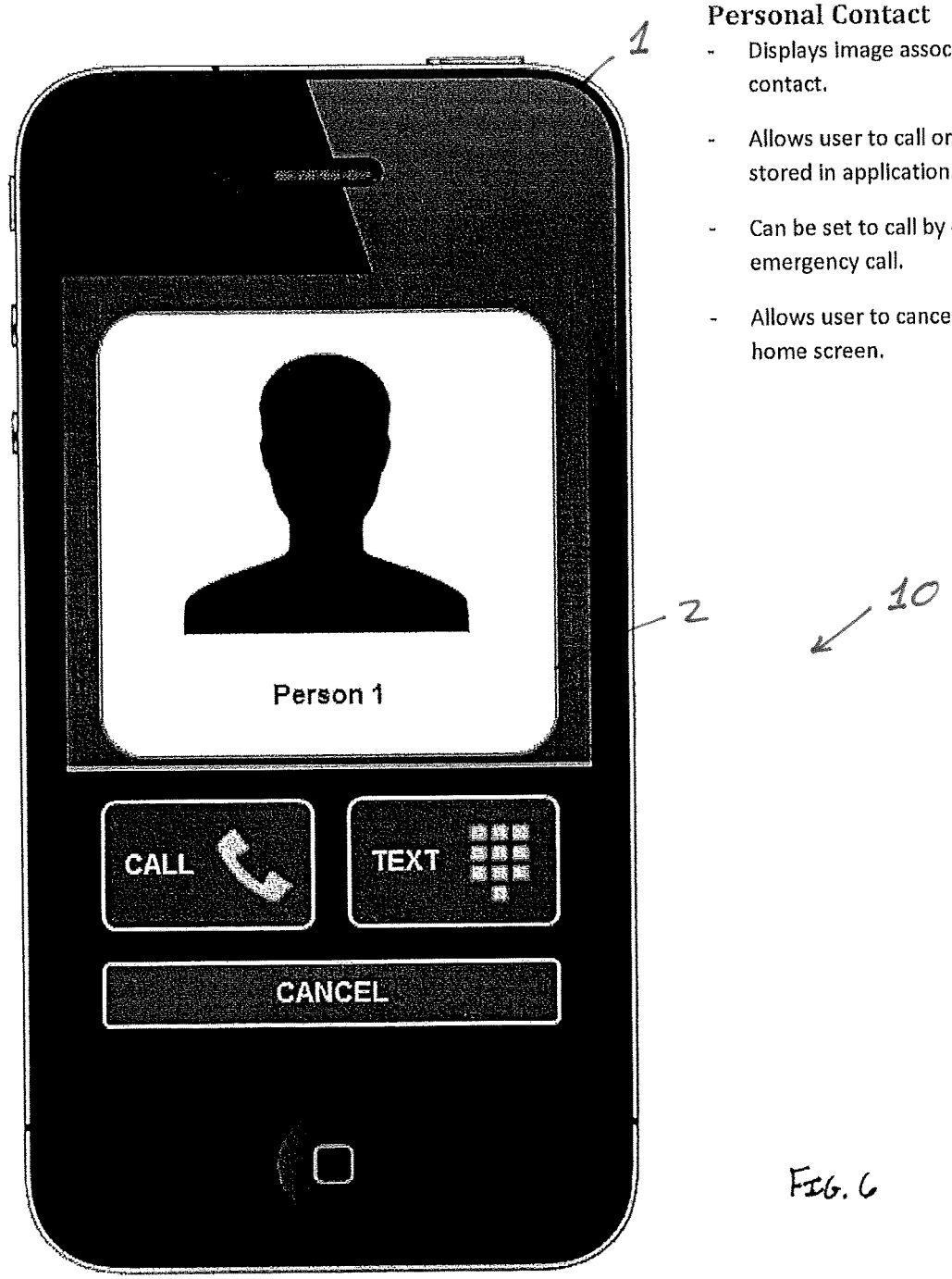
FIG. 6 is view of an individual contact display screen in accordance with one embodiment of the present invention.
Figure 7:
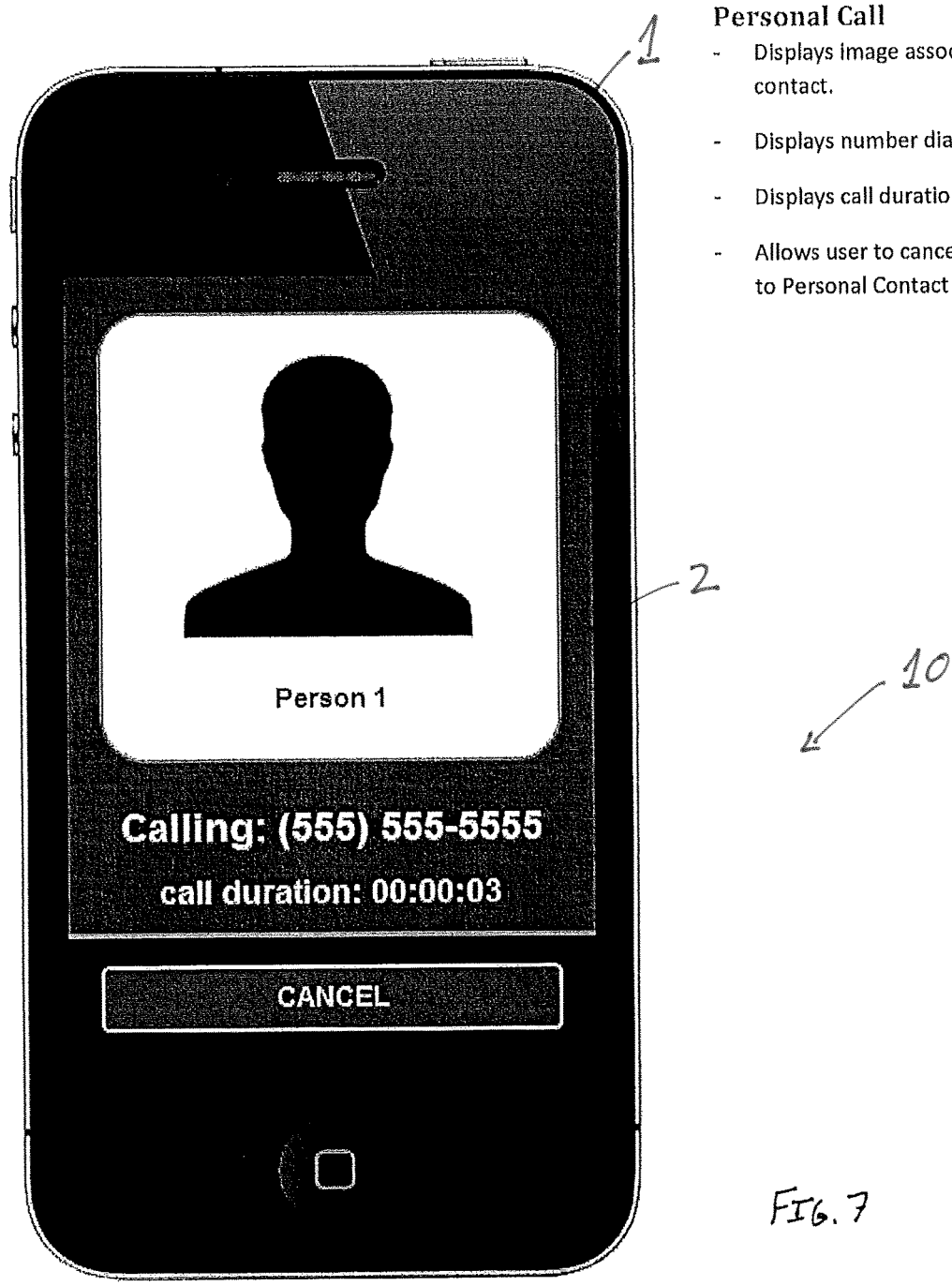
FIG. 7 is view of an individual call screen in accordance with one embodiment of the present invention.

As depicted in FIG. 5 a contact may be selected and called by a user by tapping the associated icon displayed on touch screen 2, whereby a call is initiated to the preconfigured number. The icon or photograph associated with the contact is displayed full screen during the call, and the number and duration of the call is also displayed. A cancel icon is provided to terminate the call as well. A personal contact call operates in the same fashion, as shown in FIG. 6. Additionally, a "text" icon is also provided for customized personal contacts, thereby providing a pop-up window and keypad that permits a user to compose a text message and send it to the contact. This feature of system 10 is unnecessary for emergency contacts since they don't typically accept text messages. When the "call" icon is tapped, the icon is displayed full screen and the number and duration of the call is also displayed. A cancel icon is provided to terminate the call, as shown in FIG. 7.

Figure 8:
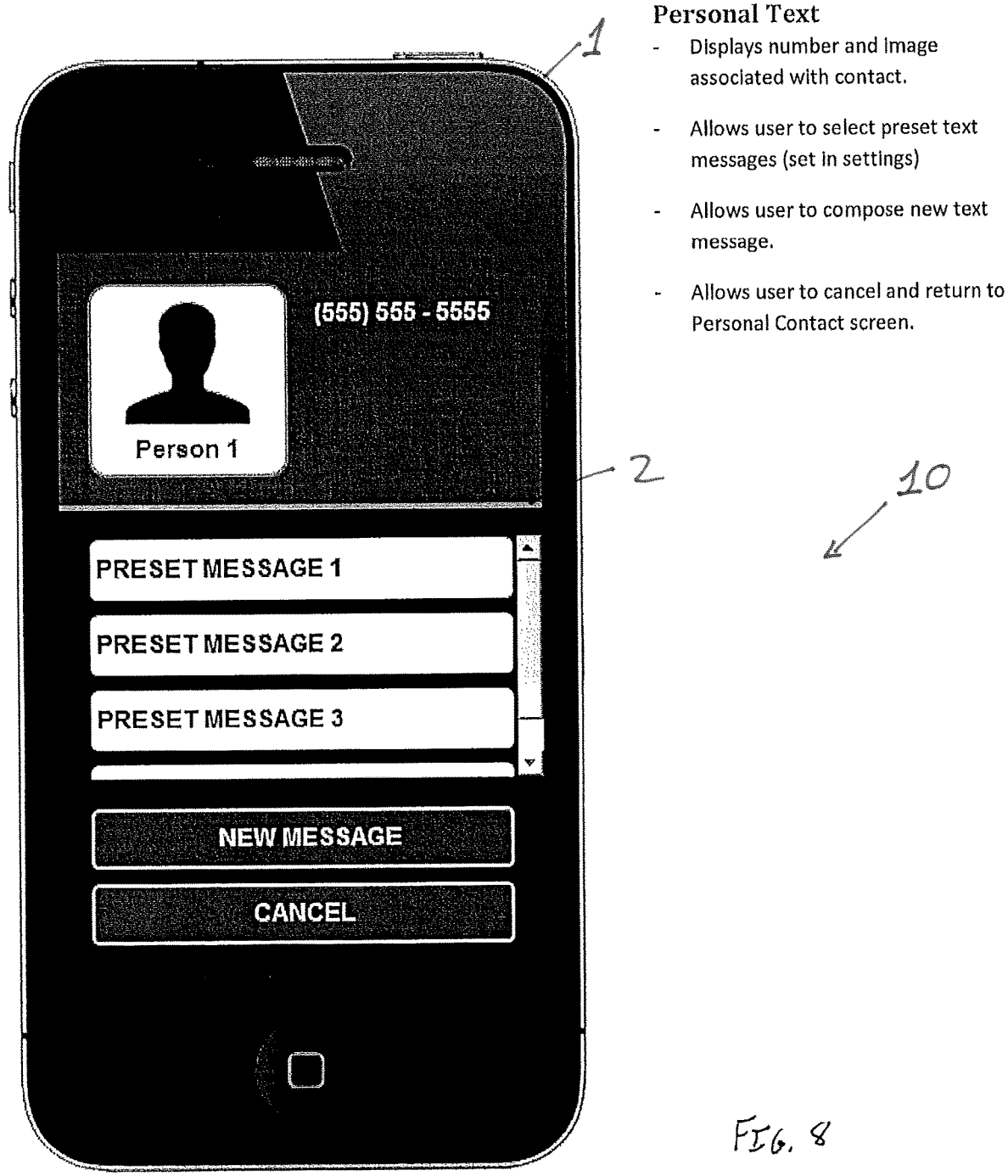
FIG. 8 is view of an individual text composition screen in accordance with one embodiment of the present invention.
Figure 9:
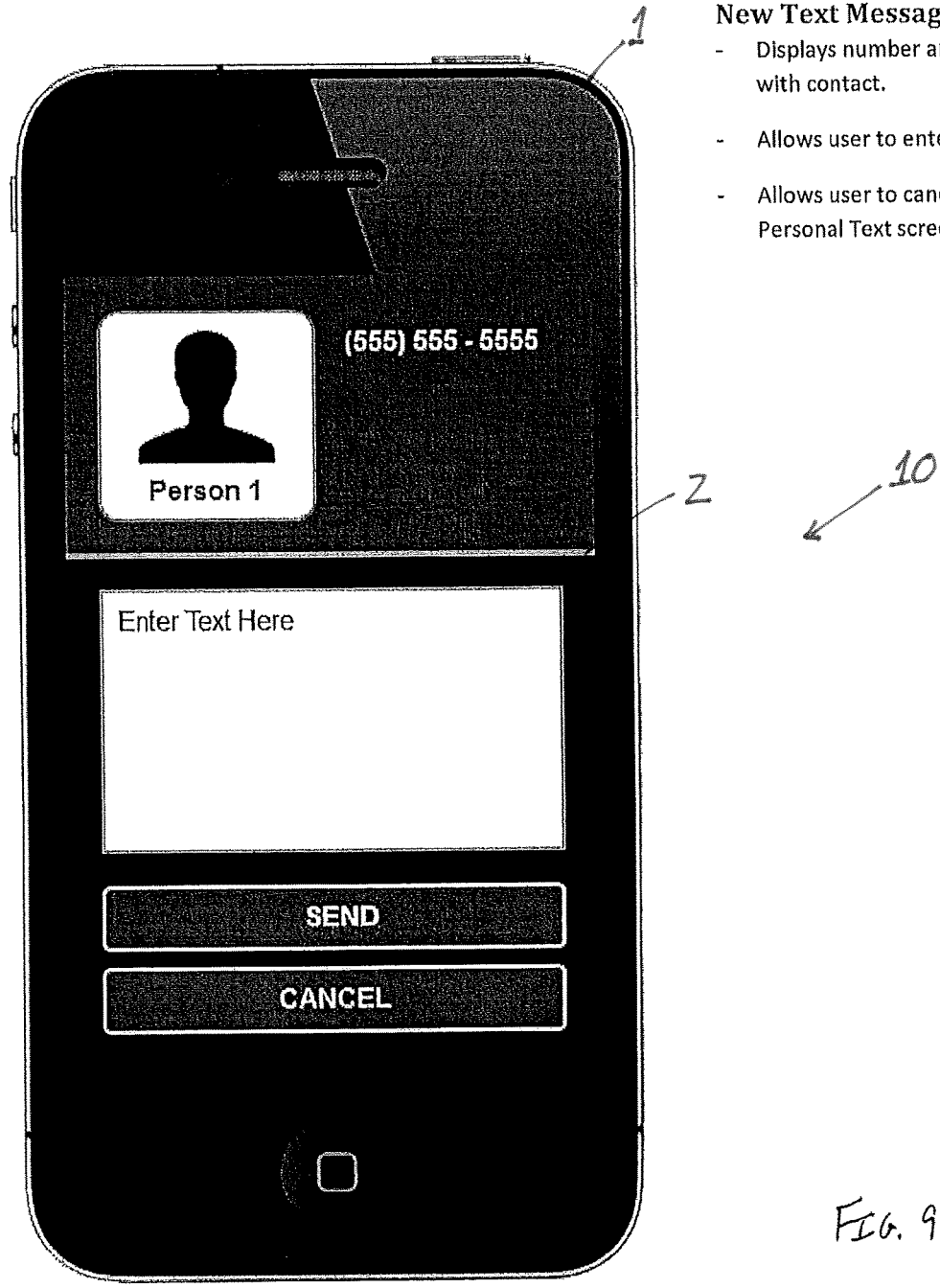
FIG. 9 is view of an individual text screen in accordance with one embodiment of the present invention.

FIG. 8 depicts a further embodiment of the invention whereby a plurality of predetermined text messages, called "preset" messages are able to be configured and used. These preset messages may be configured in the setup screen of system 10, and may typically be a message that a user would send frequently to their most common contacts, such as "On my way" or "Stopping at the store, do you need anything?". Once these preset messages are configured, a user may simply select one from the list that is displayed along with the personal contact on the text message screen, as seen in FIG. 8, to send the text to the contact. This feature of the invention saves a great deal of time for a user and makes a text much easier to send for those with physical limitations or limited reading proficiency. A cancel icon and a new message icon are also provided for convenience. Additionally, as shown in FIG. 9 a conventional text message may be composed using the system 10 of the present invention. However, the system provides a larger icon display than conventional contact applications.

Referring now to FIG. 10, system 20 provides a setup screen, discussed in some detail herein above, that provides a display and order of all contacts configured in system 10 as well as the phone numbers associated with the individual contacts and an edit and delete icon with each. Furthermore, up and down arrows are provided for each icon that move the icon up or down the display order, so that more frequently used icon may be located on top of the home display, while less-used icons may be located at the bottom, thereby obviating the need to frequently scroll the home screen down to access an often-used contact. The setup screen also provides a "new" icon that when selected, opens up a new contact for configuration as depicted in FIG. 11. This contact may then be customized by selecting an icon or photograph for display from a list or database on the device, entering a name and number to associate with the contact, or adding a plurality of preconfigured text messages to send. Save and cancel icons are provided on the new contact configuration screen to complete or discard the configured contact.

The edit contact display, shown in FIG. 12, operates in a similar fashion to the new contact screen shown in FIG. 11, and provides a user the ability to modify all previously saved contact information, as discussed in some detail above. When selected, this screen permits a user to edit an image (icon or photograph) associated with the contact. The system 10 can access the user's device photo gallery, for example a picture gallery in a mobile phone, to select an image to associate with the contact. Furthermore, the edit contact display permits a user to enter, via touchscreen 2, a new name, phone number, and add multiple preconfigured text messages to associate with the contact. The user may then save the contact for display on the home screen or discard it if necessary.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A method for managing and displaying a user's contacts in a mobile computing platform comprising: providing a setup graphical user interface on said mobile computing platform whereby a user may select a plurality of predetermined contact icons and associate a telephone number with each of said icons; providing a new contact graphical user interface on said mobile computing platform whereby a user may add and configure a plurality of contacts by entering a name and associate a telephone number and an image with said name; providing a run graphical user interface on said mobile computing platform whereby said plurality of predetermined contact icons are displayed and whereby a user may select an icon or image associated with a contact to call the telephone number associated therewith; and providing a text graphical user interface for entering a plurality of predefined text messages that may be selected from a text screen.

2. The method of claim 1 wherein said predetermined plurality of icons are selected from the group consisting of police, fire department and ambulance.

3. The method of claim 2 wherein said police icon has the telephone number 911 associated with it.

4. The method of claim 1 comprising:
an edit graphical user interface for modifying said icons and said contacts.

5. The method of claim 1 further comprising:
providing a system database for storing contact data including an e-mail address, password and device identification number.

6. The method of claim 1 wherein said database includes an image identification and an ordering identification.

7. The method of claim 1 comprising: providing a personal text user interface displaying a contact and an icon associated therewith, wherein said personal text interface displays at least one preconfigured text message that may be selected to send to said personal contact.

8. A system for managing and displaying a user's contacts in a mobile computing platform, said mobile computing platform including a processor and concomitant memory and data memory, and a graphical user interface comprising: a new contact system for creating contacts, each of said contacts having at least one of an associated icon, telephone number and e-mail address; a predetermined contact system having a plurality of predetermined contact icons having at least one of an associated telephone number and e-mail address; a contact editing system having a plurality of contacts therein, each of said contacts having at least one of an associated icon, telephone number, and e-mail address, whereby said contacts may be arranged for display; a contact display system having a plurality of contacts displayed for selection by a user; and a text graphical user interface for entering a plurality of predefined text messages that may be selected from a text screen.

9. A system for managing and displaying a user's contacts as claimed in claim 8 comprising:
   a start system icon for displaying said contact display system.

10. A system for managing and displaying a user's contacts as claimed in claim 8 comprising:
   a database for storing said contacts, said database providing access to said contacts for said contact display system.

11. A system for managing and displaying a user's contacts as claimed in claim 8 comprising:
   a graphical user interface displaying contact icons or images for selection by said user.

* * * * *